United States Patent
Komoda et al.

(10) Patent No.: US 6,701,063 B1
(45) Date of Patent: Mar. 2, 2004

(54) VIDEO DISC RECORDING AND REPRODUCING APPARATUS, AND METHOD USING THE SAME

(75) Inventors: Osamu Komoda, Yokohama (JP); Tamotsu Ito, Ayase (JP); Masahiro Kageyama, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/366,642

(22) Filed: Aug. 4, 1999

(30) Foreign Application Priority Data

Aug. 4, 1998 (JP) .......................... 10-220095
Sep. 21, 1998 (JP) .......................... 10-265951

(51) Int. Cl.$^7$ .................. H04N 5/781; H04N 5/225
(52) U.S. Cl. .................. 386/95; 386/125; 386/126; 348/231.2
(58) Field of Search .................. 386/1, 45, 33, 386/37, 40, 95, 69–70, 124, 125, 126, 94, 117, 120, 123; 348/220.1, 231.3, 231.5, 231.2; 358/906, 909.1; 360/60; H04N 5/76, 5/781, 5/225, 9/79, 5/92

(56) References Cited

U.S. PATENT DOCUMENTS

| | | | | |
|---|---|---|---|---|
| 5,612,900 A | * | 3/1997 | Azadegan et al. | 709/247 |
| 5,995,095 A | * | 11/1999 | Ratakonda | 345/328 |
| 6,118,450 A | * | 9/2000 | Proehl et al. | 345/349 |
| 6,188,653 B1 | * | 2/2001 | Nagano et al. | 369/121 |
| 6,192,191 B1 | * | 2/2001 | Suga et al. | 348/231 |
| 6,424,385 B1 | * | 7/2002 | Koyama et al. | 386/69 |
| 6,434,107 B1 | * | 8/2002 | Artigalas et al. | 369/275.1 |
| 6,437,933 B1 | * | 8/2002 | Sugiyama et al. | 360/60 |
| 2002/0090206 A1 | * | 7/2002 | Kikuchi et al. | 386/111 |

FOREIGN PATENT DOCUMENTS

| | | |
|---|---|---|
| EP | 0 691 652 | 1/1996 |
| WO | 96/08014 | 3/1996 |

* cited by examiner

Primary Examiner—Thai Tran
(74) Attorney, Agent, or Firm—Antonelli, Terry, Stout & Kraus, LLP

(57) ABSTRACT

A first video file managed by a first directory having a DVD standard and a second video file which has High-resolution are recorded on optical disc. Reference information in order to refer to said second video data is recorded in said first video file. This makes it possible to store video data by a different compression method on the standard DVD disc as well as standard DVD video data.

20 Claims, 6 Drawing Sheets

VIDEO DISC RECORDING AND REPRODUCING APPARATUS, AND METHOD USING THE SAME

BACKGROUND OF THE INVENTION

The present invention relates to a video recorder/player, especially a video recorder/player using an optical disc as a recording medium. The recording density of optical disc has been increased remarkably. For example, a 12 cm diameter DVD-ROM (type of read-only small optical disc) has a 4.7 GB storage capacity for a single side. A DVD-R (type of recordable small optical disc), which can record data one time into each track, has a 3.9 GB storage capacity for a single side. Further, a DVD-RAM (type of rewritable small optical disc), which can record data many times in each track has a 2.6 GB storage capacity for a single side.

An image compression technique, which reduces the size of video data with little data loss, also has been developed. Especially, an implementation of the MPEG2 image-encoding algorithm by the Moving Picture Experts Group has enabled the production of a video display with a sufficient picture quality at a low rate of 4–5 Mbps. As a result, DVD video players using a 4.7 GB storage capacity DVD-ROM disc, which can record 2 or more hours of video images, is now available on the market.

For the video data that is stored and reproduced by a disc, a directory format have been formulated as a DVD standard. Therefore, for a video player based on the DVD standard, video data recorded in other than the standard format could not be reproduced, and video data encoded in a non-standard format could not be decoded with a standard DVD player.

SUMMARY OF THE INVENTION

The first object of a present invention is to provide a file system having a directory outside the video standard, while also maintaining a directory in compliance with the video standard.

The second object of a present invention is to provide a video disc recorder/player that can reproduce video data using a different encoding method from a standard encoding method based on a video standard.

To achieve the foregoing objects, reference information is recorded in a file, which is managed by a directory under a video standard, such as DVD, are recorded on the optical disc. By this method, a file controlled by a directory outside the video standard can be accessed in conformity with the video standard. Video data that was encoded by a video standard, such as DVD, and encoded by a different method is recorded on the optical disc.

DETAILED DESCRIPTION OF THE INVENTION

Figure 1:
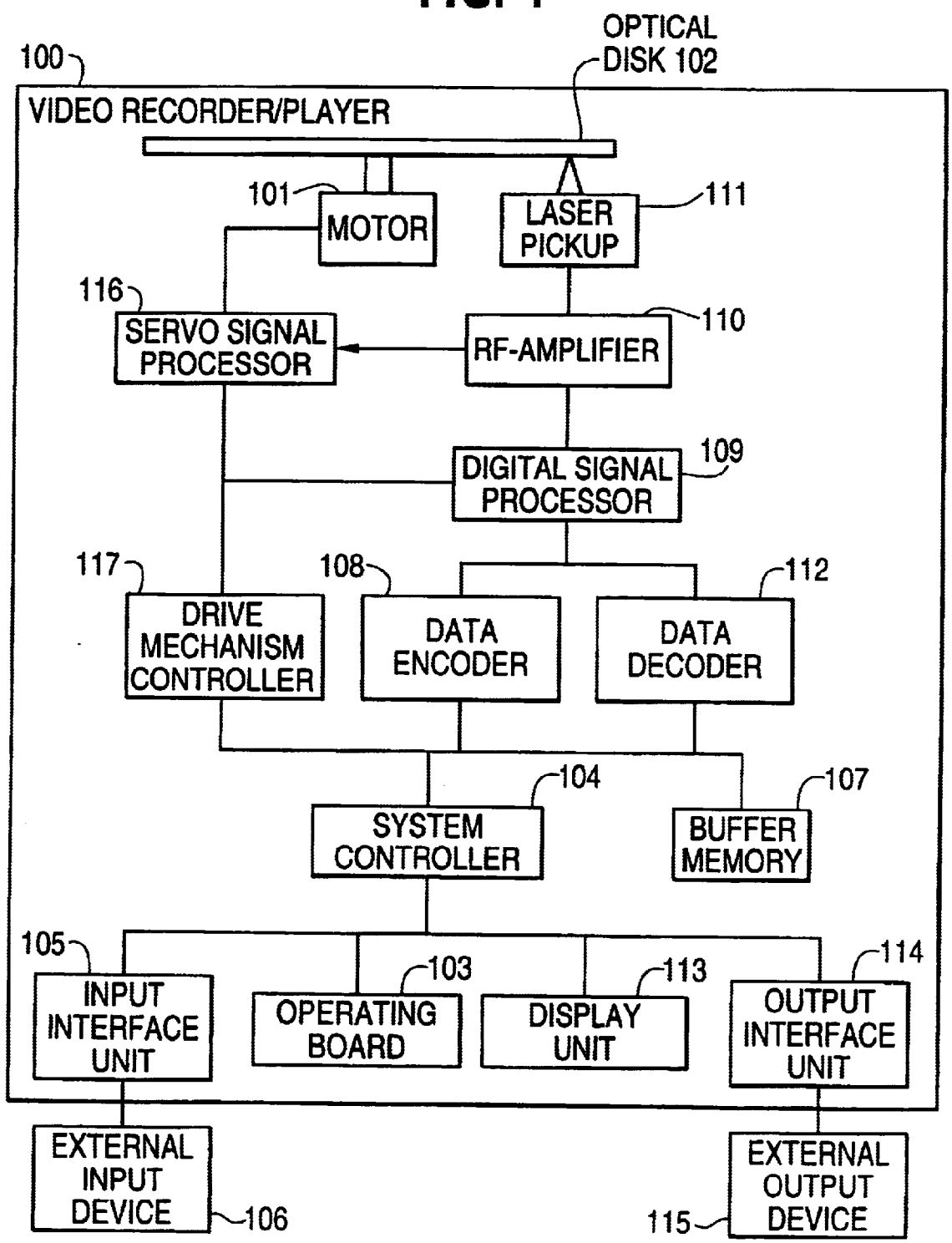
FIG. 1 is a block diagram of a video recorder/player representing a preferred embodiment of the present invention.

FIG. 1 is a block diagram of a video recorder/player device representing a preferred embodiment of the invention. Video recorder/player 100 is a video camera recorder using an optical disc, for example. Motor 101 rotates an optical disc 102 mounted on a disc hub (not shown). The optical disc 102 is a WO (Write Once) or a WM (Write Many) disc medium of 12 cm or 8 cm diameter in compliance with the DVD standard.

System controller 104 receives record start instructions from an operating board 103, such as a keyboard or control buttons, for example. Also, the system controller 104 stores input data received from an external input device 106 through input interface unit 105, which data is stored in a buffer memory 107. A data encoder 108 encodes buffered data stored in the buffer memory 107 and a digital signal processor 109 modulates the encoded data to produce a modulated signal. A high-frequency amplifier (RF-amplifier) 110 amplifies the modulated signal, and then a laser pickup 111 records the amplified signal data on the optical disc 102.

In the reproducing operation, the laser pickup 111 reads out a reflected signal from an optical disc and an RF-amplifier-110 amplifies the read out signal. The digital signal processor 109 demodulates the amplified signal. Then, a data decoder 112 decodes the demodulated signal into a digital signal, which is output to a display unit 113, or to an external output device 115 via an output interface unit 114, based on control provided by the system controller 104.

A servo signal processor 116 generates a servo signal based on a signal received from the RF-amplifier 110, and a drive mechanism controller 117 controls rotation of the motor 101 via the servo signal processor 116. The drive mechanism controller 117 monitors the servo signal and controls the digital signal processor 109 to record or reproduce a signal on or from the optical disc 102. Display unit 113, such as small LCD (Liquid Crystal Display), for example, displays the recorded or reproduced video signal. Display unit 113 also may display data received from an external input device 106. The external input device 106 may take the form of a video input device, such as a TV tuner, a digital camera or an external camera. A video disc camera recorder (camcorder) using an optical disc can be obtained by installing a video recorder/player 100 and a camera as a external output device 115 into a single case. In such a case, it is possible to use a smaller DVD disc, such as an 8 cm disc or a disc of less diameter, to reduce the size of the camcorder.

A large-sized CRT (Cathode Ray Tube), a television set, a video printer or other image output devices, which are connected to the outside of video recorder/player 100, also may serve as the external output device 115.

Figure 2:
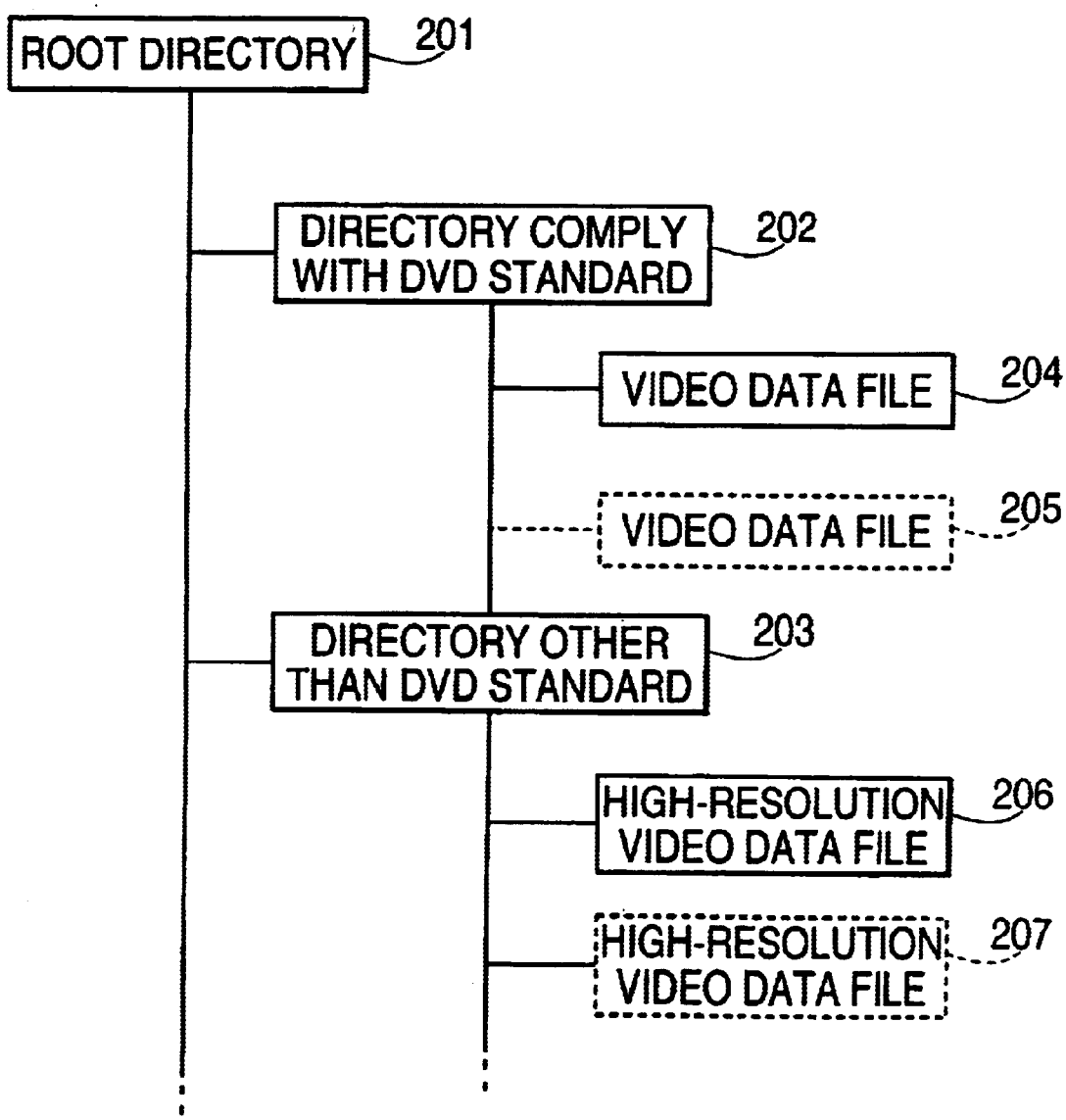
FIG. 2 is a diagram which shows a directory structure according to an embodiment of the invention.

An example of the structure of directories that manage data stored in an optical disc 102 is shown in FIG. 2. Directories contain bookkeeping information concerning files stored in the optical disc 102. To access a file, it may be necessary to specify the names of directories and files. Directories also contain management information (name, organization method, protection level of the stored data, and stored address, etc.) of a file stored in the optical disc 102. In an optical disc 102, usually one root directory 201 exists, and as subdirectories, a directory 202, which complies with the DVD standard, and a directory 203, which does not comply with the DVD standard also exist. Only one directory 202 and one directory 203 are shown in FIG. 2; however, there can be multiplicity of these subdirectories. The subdirectory 202 contains bookkeeping and storage information concerning video data files 204 and 205. The files 204 or 205 may contain a single video data file or many video data files.

The subdirectory 203, which does not comply with the DVD standard, manages storage information of high-resolution video data files 206 and 207. The files 206 or 207 may contains a single video data file or many video data files. While a directory 203 does not exist in the commercialized DVD-ROM movie disc, this directory 203 may be constructed by a personal computer, etc. to have a structure like that of FIG. 2.

Figure 3:
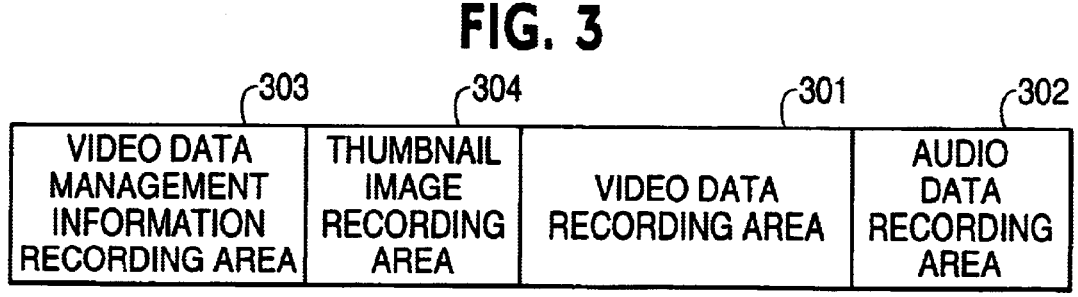
FIG. 3 is a diagram showing the content of a video data record area according to the DVD standard encode method.

In FIG. 3, an example of the content of the recording area according to the DVD standard is shown. The video data according to the DVD standard is stored in a video data recording area 301 in a compressed manner. Audio data is recorded in an audio data recording area 302, if any audio data exists. Recording areas of video data and audio data are usually composed of several sectors. These two types of data are recorded in an interleaved manner in order to synchronize playing of the audio data and video data. A video data management information recording area 303 is provided at the head of the data record areas (304, 301, 302); however, the invention is not limited thereto, and so it is possible to change the location of the video data management information recording area 303. For example, area 303 may be defined in the area following the area 301, or video data management information may be recorded with video data in a multiple distributed allocation manner, or video data management information may be recorded with video data in the area 301.

The video data management information recording area 303 typically contains the information shown in Table 1.

TABLE 1

| Contents | Number of Bytes |
| --- | --- |
| ID code | 8 |
| Bit rate | 4 |
| Camera information | 80 |
| Resolution | 4 |
| Recording time | 8 |
| GPS data | 16 |
| Reference address | 64 |

The ID (Identification) code indicates whether a sector stored is video data or audio data. In this embodiment, the ID code indicates image data or video data outside the DVD standard. The bit rate is the data transfer speed that is necessary for decoding compressed video data. The camera information contains the iris and shutter speed data used for camera control. The resolution indicates the number of pixels. In the DVD standard, the resolution is 720×480 pixels. The recording time indicates the length of recorded video in seconds. The GPS data indicates a position on the disc where the video data can be obtained from and recorded into by the video recorder/player. The reference address indicates address (location) information where corresponding or additional high-resolution video in connection with a standard DVD video is stored in the optical disc 102. In a case where no reference address exists, it is assumed that only DVD standard video data is recorded on the optical disc 102.

A thumbnail image, which is used for retrieval of a desired picture within the video, is stored in a thumbnail recording area 304. However, the area 304 may be omitted if the capability of providing a thumbnail image does not exist. A thumbnail image shows a user the contents of video data recorded in an optical disc with a reduced image. A thumbnail image is created by converting the resolution of input video data and outputting the data to a screen of a display unit 113 a multiplicity of times. The displayed data does not have as high a resolution as the original video data. While typically only one thumbnail image is inserted ahead of or behind the video data recording area 301, it is possible to insert a plurality of thumbnail image recording areas. While video data management information recording area 303 and thumbnail image recording area 304 are located physically in the video data file in compliance with the DVD standard, it is possible to record this information outside of the video data file and effect control thereof as logically recorded data in the video data file in compliance with the DVD standard.

Figure 4:
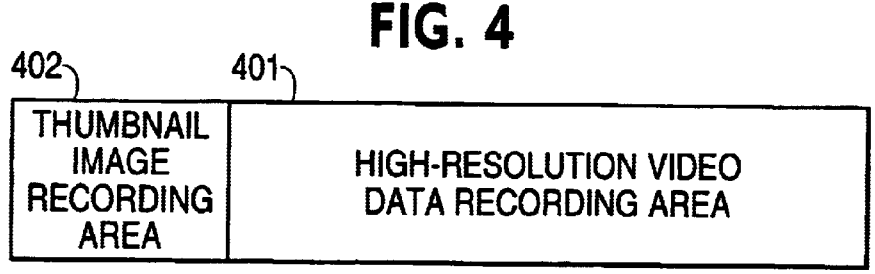
FIG. 4 is a diagram showing the content of a high-resolution image data record area outside the DVD standard.

In FIG. 4, an example of the controls of the high-resolution video data recording area is shown. High-resolution video data is stored in high-resolution video data recording area 401. In this embodiment, a thumbnail image of high-resolution video is stored in thumbnail image recording area 402, which is located ahead of the high-resolution video data recording area 401. However, the thumbnail image recording area 402 may be omitted, if the function associated therewith does not exist.

A thumbnail image is created by converting the resolution of the input video data and outputting the data to a screen of the display unit 103. The displayed data does not have as high a resolution as the original video data. While typically only one thumbnail image is inserted ahead of or behind the video data recording area 401, it is possible to provide a plurality of thumbnail image recording areas.

Figure 5:
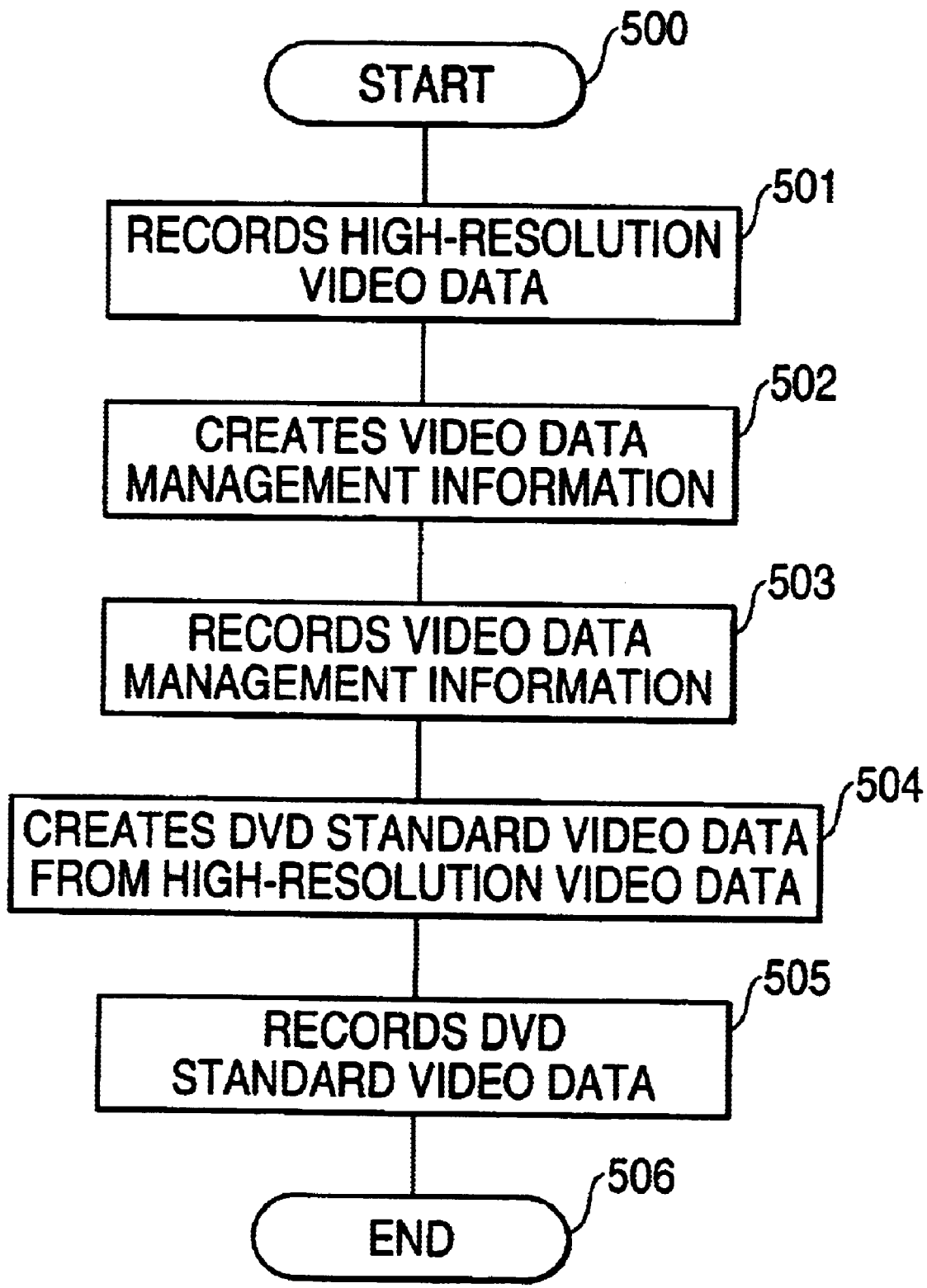
FIG. 5 is a flowchart that shows an image data recording sequence.

Now, a flowchart of the process of recording video data on an optical disc will be explained with reference to FIG. 5. The process starts at step 500, at which time input video data from an external input device 106, such as a camera recorder (camcorder), for example, is recorded as high-resolution video data in a directory other than the DVD standard directory of an optical disc as a high-resolution image (Step 501).

In this regard, the resolution of the high-resolution image that is recorded by a camcorder is higher than that of video data (MPEG2: 720×480 pixels) based on the DVD standard. A high-resolution image (1024×768 pixels) using a JPEG (Joint Photograph Expert Group) method of compression may be used, for example. On this occasion, a thumbnail image is generated from the high-resolution video data and stored in the optical disc 102. Image data management information, such as a time stamp, camera information and resolution data are generated and stored on the optical disc 102. This information is added to the standard video data (step 502). Further, a reference address, which represents an address of a high-resolution image file, is added to the video data management information 303.

Image data management information generated by step 502 is recorded in the video management information recording area 303, which is added to the video data recording area conforming to the DVD standard on the optical disc 102 (step 503). At this time, a thumbnail image corresponding to the video data is generated from the input video data and stored onto the optical disc 102. Then, video data conforming to the DVD standard is created by converting the resolution from high-resolution video data (step 504). Then, video data conforming to the DVD standard is stored in an area following the video management information recording area 303, which was stored in step 503 (step 504), and then the process ends (step 506). Although not shown in FIG. 5, a step in which reference address information of normal video data is added to the high-resolution video data recording area, may be added to the process. As a result of this added feature, video data can be referenced relative to each other.

Figure 6:
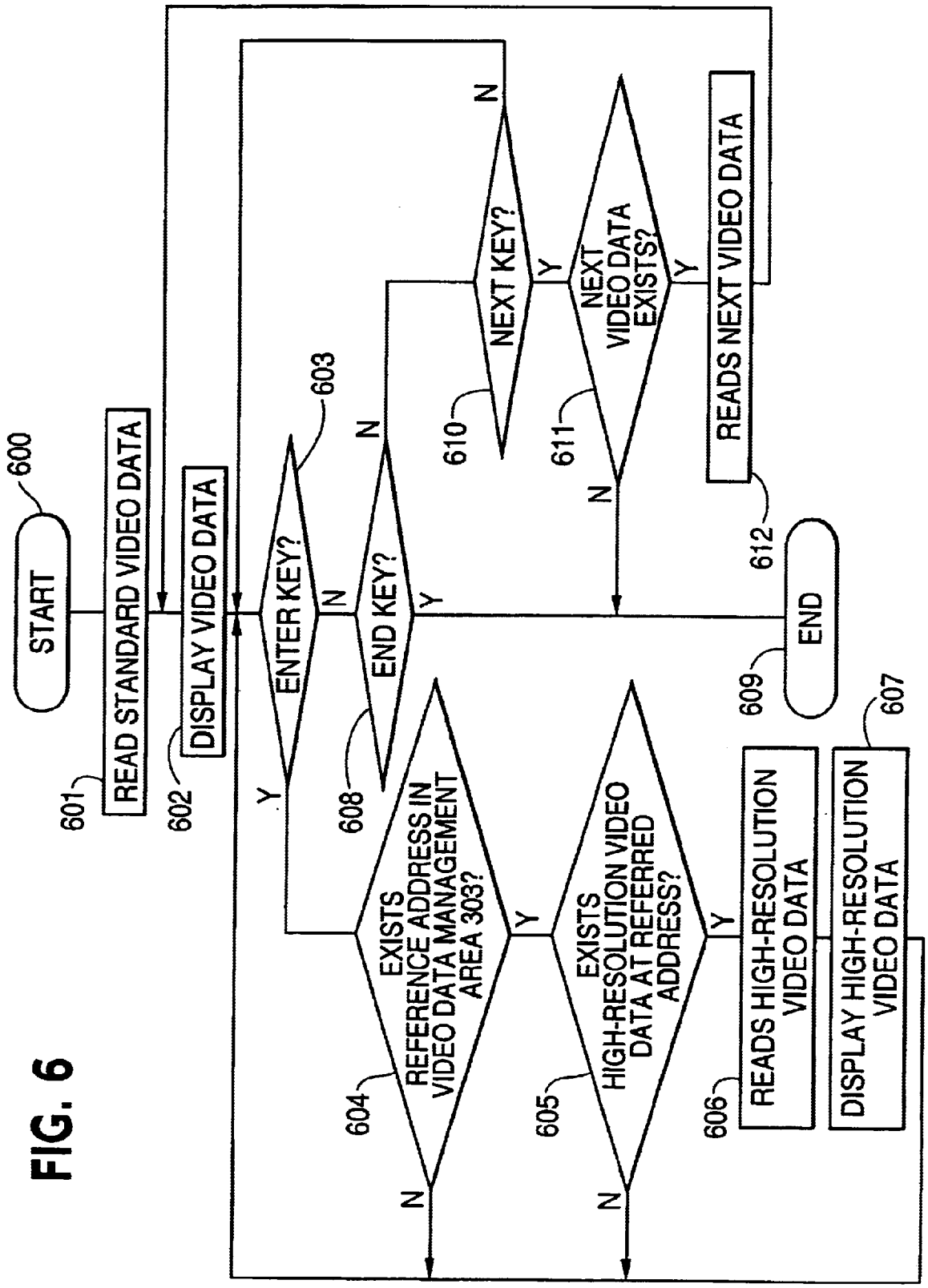
FIG. 6 is a flowchart that shows an image data reproducing sequence.

Next, a flowchart of the process of reproducing video data recorded on optical disc 102 will be explained by reference to FIG. 6. First, the video recorder/player 100 is set to the playing mode, and an optical disc 102 is inserted in the unit (Step 600). Then, image data is read by the laser pickup 111 and decoded (step 601). Then, image data read in step 601 is displayed on a display unit 113, or on an external output device 115, in a normal mode, which complies with the DVD standard (Step 602). If a user, who is watching a output video image, hits the "ENTER" key, then the process will proceed to step 604 (Step 603). If no key has been hit at this time, the process proceeds to step 608. Actuation of the "ENTER" key means that high-resolution video data is selected or desired by the user. Hitting the "ENTER" key to initiate this operation is not essential, since it is possible to select any other method to input an indication signal for this operation, such as to hit any other key on the keyboard or a control button.

The video data management information 303 is checked to see if such information exists in the area ahead of the video data recording area 301. If such information does exist, then, a judgment is made as to whether or not reference address information is contained in the video data management information 303 (Step 604). If reference address information exists, the process advances to step 605, otherwise it returns to step 603.

Then, it is determined whether or not the high-resolution video data that the reference address points to exists in the area 401. If it exists, then the process advances to step 606, otherwise it returns to step 603. High-resolution video data is read from optical disc 102 (step 606) and is displayed on the display unit 113 or the external output device instead of standard quality video. (Step 607) After displaying the high-resolution video data during a predetermined time period, the process proceeds to step 603 (Step 607). In case the "ENTER" key has not been actuated in step 603, then it is checked to see if the user has hit the "END" key (Step 608). When the "END" key is actuated in step 608, the video reproducing operation ends (Step 609).

In case the "END" key is not actuated in step 608, then it is checked to see if the user has hit the "NEXT" key (Step 608). When the "NEXT" key is actuated in step 610, then it is checked to see if there is additional video data to be played (Step 611). If additional video data exists, the following video data is read from the optical disc (Step 612) and is displayed in the DVD standard mode (Step 602). If at step 611 it is determined that there is no following image data, the process is ended in step 609.

Next, a display method for using a thumbnail image to retrieve a desired portion of video data will be explained with reference to FIG. 7. In step 701, a thumbnail image of video data which is recorded in the process illustrated in the flowchart of FIG. 5, is read from optical disc 102 (Step 701). Thumbnail image data read out from the optical disc 102 is displayed at a desired position on the display unit 113 (Step 702). Next, it is checked to determine whether the thumbnail image data has been displayed a predetermined number of times on the display screen (Step 704). The predetermined number may be one or more. In case the process of displaying the thumbnail image is completed, the process proceeds to step 704; otherwise, it proceeds to step 705 (Step 703). The number of times a thumbnail image is displayed on the screen of the display unit 113 is determined in accordance with the relationship between the resolution of the thumbnail image and the resolution of a display screen. For example, if the resolution of the thumbnail image is 1/16 of the display screen resolution, the maximum number of displays may be set to 16.

In step 705, it is determined whether there is a following thumbnail image to be displayed. If there is another thumbnail image to be displayed, it is read out and displayed on display unit 113 or on the external output device 115 (Step 706, 702).

After the display of a predetermined number of thumbnail images has been completed, the process waits for an input from a user via operating board 103. Upon receipt of an input from a user, it is determined whether the user has selected a thumbnail image to be displayed. If the user selects one, the process proceeds to step 707, otherwise it proceeds to step 713 (Step 704).

The existence of a video management information recording area 303 in the video data that corresponds to a thumbnail image selected in step 704, and the existence of information identifying a reference address in the video data recording area 301, are checked. If they exist, the process proceeds to step 708, otherwise it proceeds to step 711 (Step 707).

Then, in step 708, it is determined whether high-resolution video data exists in the high-resolution video data recording area 401 at the address on the optical disc 102 pointed to by the reference address. If such high-resolution video data exists, the process proceeds to step 709, otherwise it proceeds to step 711. High-resolution image data is read from the optical disc 102 and is displayed on the display unit 113 or is supplied to the external output device 115 (Steps 709, 710). After displaying the high-resolution video data, the process returns to step 704.

When there is no high-resolution video data, at step 711 the standard video data corresponding to the thumbnail image selected in step 704 is read out from the video data recording area 301, instead of high-resolution video data (Step 711). Then, the standard video data is displayed on display unit 113 or is supplied to the external output device 115 (Step 712). After the selected portion, which corresponds to a thumbnail image, is reproduced and displayed to the user, the process returns to step 704.

In step 704, when no thumbnail image to be displayed as a high-resolution image is selected, it proceeds to step 713 and waits for the next key input by the user. When "END" key is input in step 713, the process of FIG. 7 ends. (Step 714)

In case "END" key is not input in step 713, it the process determines whether "NEXT" key is input (Step 715). The process proceeds to step 716 when "NEXT" key is input, and then it is checked to see if there is a following thumbnail image (Step 716), otherwise the process returns to step 704. If another thumbnail image exists, the next thumbnail image is read out from the disc 102 and the process returns to step 702 (step 717). Otherwise, the process returns to step 714 (step 716).

Figure 7:
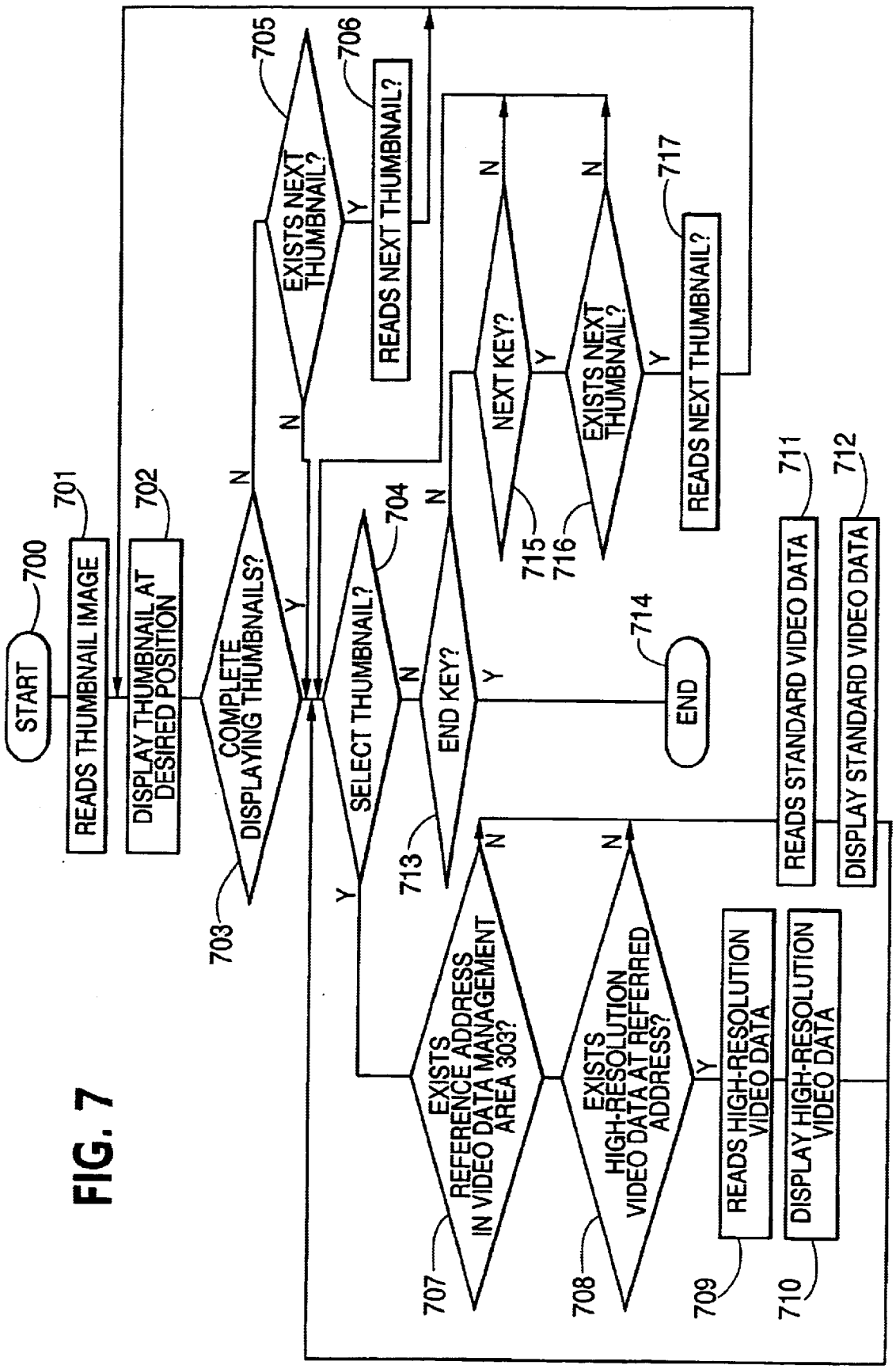
FIG. 7 is a flowchart that shows a sequence for reproducing video data selectively by using a thumbnail image.

Desired video data stored in the optical disc is selected by using thumbnail image, and the thumbnail images are reproduced and displayed according to the process flow shown in FIG. 7. It is possible to modify the method shown in FIG. 7 by using a high-resolution thumbnail image instead of a DVD standard thumbnail image at step 701, for example. In this case, if only high-resolution video data is used, it is possible to delete steps 707, 708, 711, 715 from the process shown in the flowchart of FIG. 7.

In this embodiment, while high-resolution video data is referred to as a reference or additional data in addition to DVD standard video data, it is possible to use a text information file, an audio information file, and program data for a computer as a reference or additional data. In this embodiment, while video data which is referred to by a reference address is managed by a directory other than the directory for DVD standard data, it is possible to create another directory under the directory which is in compliance with DVD standard 202 and control it.

Now, an alternative form of the management information, which is stored in the video data management information recording area 303, will be explained by reference to table 2.

TABLE 2

| Contents | Number of bytes |
| --- | --- |
| Id code | 8 |
| Bit rate | 4 |
| Camera information | 80 |
| Resolution | 4 |
| Record time | 8 |
| GPS data | 16 |
| Access history | 6 |
| Manufacturer code | 8 |
| Size information | 2 |
| Reference address | 64 |
| Text | Variable-length |

The contents of ID code, bit rate, camera information, resolution, record time, GPS data and reference address fields are the same as the contents of corresponding fields explained with reference to Table 1. Access history indicates the number of times the video data stored in video data recording area 301 has been played or a date (and/or time) when the video data has been last played. It is possible to record data and a time in the "Recording time" area after the video data has been played. If the "Access History" area is filled up, while not shown in Table 2, it is possible to add a "continuous code (or flag)" in the video data management information recording area 303 to indicate that the access history data continues and include the address of an additional access history area on the optical disc 102.

The "Manufacturer code" indicates a manufacturer of the recording device, such as the video camera which recorded the video data, into the video data recording area 301 of the optical disc 102.

Size information indicates the size of a recording area positioned after the "size information" field in the table 2, i.e. the size of the reference address and text fields. In other words, size information indicates the total bytes of 64+ (Variable-length) in Table 2. Since the length of the reference address field is fixed, it is possible to calculate the size of the "TEXT" field and determine the end reference address and the end of the text.

Text can be recorded on the video data recording area 301, when or after the recording device records video data by a recording device made by any manufacturer.

The maximum size of the text can be taken as a size other than text in the video management information recording area 303 of Table 2.

If the "TEXT" area is filled up, while not shown in Table 2, it is possible to add a "continuous code (or flag)" in the video data management information recording area 303 to indicate that the TEXT continues and include the address of an additional TEXT area on the optical disc 102. While it is indicated that TEXT is recorded in addition to the video data in the video data recording area 301, it is possible to record binary data or any other data instead of (or in addition to) text data.

The number of bytes indicated in Table 2 is provided only by way of example, and so the number of bytes may be set as desired. Also, it is possible to change the contents of fields, such as manufacturer code or TEXT, in Table 2.

Now, an alternative embodiment of the management information, which is stored in the video data management information recording area 303, will be explained by reference to Table 3.

TABLE 3

| Contents | Number of Bytes |
| --- | --- |
| ID code | 8 |
| Bit rate | 4 |
| Camera information | 80 |
| Resolution | 4 |
| Record time | 8 |
| The GPS data | 16 |
| Access history | 6 |
| Manufacturer code | 8 |
| Size information | 2 |
| Number of reference addresses | 2 |
| Reference address 1 | 64 |
| Reference address 2 | 64 |
| : | : |
| Reference address N | 64 |
| Text | Variable-length |

The contents of the ID code, bit rate, camera information, resolution, record time, GPS data and reference address fields are the same as the contents of corresponding fields explained with reference to Table 1. The contents of the access history, manufacturer code and TEXT fields are the same as the contents of corresponding fields explained with reference to Table 2.

A plurality of reference addresses, i.e. reference address 1, reference address 2, . . . , reference address N (N is a natural number), each of which is an address similar to the reference address explained with reference to Table 1, are included in the video data management recording area 303. These reference addresses indicate the existence of several items of reference information in connection with video data stored under the DVD standard and indicate the physical or logical addresses of such reference information on the optical disc 102.

Size information indicates the size of a recording area positioned after the "size information" field in the Table 3, i.e. the total size of the number of reference addresses, reference address 1, . . . , reference address N and text fields. In other words, size information indicates the total bytes of 2+64:N+(Variable-length) in Table 3.

The number of reference addresses indicates the number of addresses recorded on video data management recording area 303, i.e. the value of N in Table 3. Since the length of the reference address field is fixed, it is possible to calculate the size of the "TEXT" field and determine the boundary of a reference address N and a text field.

The numbers of bytes indicated in Table 3 are provided only by way of example, and so the number of bytes may be set as desired. Also, it is possible to change the contents fields, such as manufacturer code or TEXT, in Table 3.

Next, a further alternative form of management information, which is stored in the video data management information recording area 303, will be explained with reference to Table 4.

TABLE 4

| Contents | Number of Bytes |
|---|---|
| ID code | 8 |
| Bit rate | 4 |
| Camera information | 80 |
| Resolution | 4 |
| Record time | 8 |
| The GPS data | 16 |
| Access history | 6 |
| Size Information | 2 |
| Manufacturer code 1 | 8 |
| Reference address 1 | 64 |
| Text 1 | Variable-length |
| Manufacturer code 2 | 8 |
| Reference address 2 | 64 |
| Text 2 | Variable-length |
| : | : |
| Manufacturer code N | 8 |
| Reference address N | 64 |
| Text N | Variable-length |

The contents of ID code, bit rate, camera information, resolution, record time, GPS data and reference address fields are the same as the contents of corresponding fields explained with reference to Table 1. The contents of the access history, manufacturer code and TEXT fields are the same as the contents of corresponding fields explained with reference to Table 2.

A plurality of reference addresses, i.e. address 1, reference address 2, . . . , reference address N (N is a natural number), each of which is an address similar to the reference address explained with reference to Tables 1 and 2.

Those information fields, such as manufacture code M (M=1, . . . ,N), Text M (M=1, . . . N), are created and recorded on a video data management information recording area when video data is recorded on the optical disc 102 or when reference information to video data is added afterward.

Of course, there can be several items of reference information in connection with each video data item, and there can be several reference addresses that indicate the location where the data is stored. When several reference information items in connection with video data are added several times by the video data record equipment of a manufacturer, the manufacturer code M (M=1, . . . N), reference M (M=1, . . . N), and text M (M=1, . . . N) fields increase and are recorded on video management information recording area 303.

If the "manufacturer code" areas are filled up, while not shown in Table 4, it is possible to add a "continuous code (or flag)" in the video data management information recording area 303 to indicate that manufacturer codes continue, and including the address of additional manufacturer codes recorded on the optical disc 102.

Size information indicates the size of a recording area positioned after the "size information" field in the Table 3, i.e. the size of the manufacturer code 1, TEXT 1, . . . , manufacturer code N, and TEXT N fields. In other words, size information indicates the total bytes of 64: n+sum of Variable-lengths in Table 4.

The numbers of bytes indicated in table 4 are provided only by way of example, and so the number of bytes may be set as desired. Also, it is possible to change the contents of fields, such as the access history, manufacturer code or TEXT fields, in Table 4.

Next, a further alternative form of management information, which is stored in the video data management information recording area 303, will be explained with reference to Table 5.

TABLE 5

| Contents | Number of Bytes |
|---|---|
| ID code | 8 |
| Bit rate | 4 |
| Camera information | 80 |
| Resolution | 4 |
| Record time | 8 |
| The GPS data | 16 |
| Access history | 6 |
| Size information | 2 |
| Manufacturer code 1 | 8 |
| Pointer 1 | 8 |
| Manufacturer code 2 | 8 |
| Pointer 2 | 8 |
| Manufacturer code N | 8 |
| Pointer N | 8 |
| Reference address 1 | 64 |
| Text 1 | Variable-length |
| Reference address 2 | 64 |
| Text 2 | Variable-length |
| : | : |
| Reference address N | 64 |
| Text N | Variable-length |

The contents of the ID code, bit rate, camera information, resolution, record time and GPS data fields are the same as the contents of corresponding fields explained with reference to Table 1. The contents of the access history field is the same as the content of the corresponding field explained with reference to Table 2. The manufacturer code N, reference address N and text N (N is a natural number) fields are the same as the manufacturer code, reference address and text fields explained with reference to Tables 1 and 2.

Pointer N indicates where the reference address N begins. Pointer N is recorded at the time that video data is stored on optical disc 102 by the video recorder/player 100, or it is recorded at the time that reference information is added in connection with video data. The manufacturer code N field indicates the manufacturer of a video recorder/player used for recording, and the text N field has text form data added at the time of its recording, and reference address N is also recorded.

Of course, a plurality of reference information in connection with video data, and plurality of reference addresses which identify the location of each reference information item may be recorded. When several reference information items in connection with video data are added several times by recorders of different manufacturers, the combination information of manufacturer code N, pointer N, reference address N and text N increases and such combinations are recorded on video management information recording area 303.

If the combination information of manufacturer code N, pointer N, reference address N and text N fills up the area, while not shown in Table 5, it is possible to add a "continuous code (or flag)" in the video data management information recording area 303 to indicate that the information continues, and including the address of additional manufacturer codes recorded on the optical disc 102.

Size information indicates the size of a recording area positioned after the "size information" field in the Table 5, i.e. the size of the manufacturer code 1, . . . TEXT N fields.

The number of bytes indicated in Table 5 are provided only by way of example, and so the number of bytes may be set as desired. Also, it is possible to change the contents of fields, such as the access history, manufacturer code or TEXT fields, in Table 5.

According to the invention, it is possible to refer to other files, which are controlled by a directory outside the DVD standard from a file controlled in compliance with the directory by the DVD standard.

It is also possible to employ a different coding method or compression method outside the DVD standard in addition to the MPEG compression method by the DVD standard while maintaining a clear reference relation with that information. Also you can reproduce each coded or compressed video while maintaining DVD standard.

What is claimed is:

1. In a video disc recording and reproducing apparatus, a method for recording and/or reproducing image data, the method comprising:

recording video data files which comply with a first predetermined standard;

recording a first directory for managing the video data files, and which compiles with the first predetermined standard;

recording data files which are related to ones of the video data files, and which comply with a second predetermined standard which is different from the first predetermined standard;

recording a second directory for managing the data files; and recording video managing information in the video data files, and which complies with the first predetermined standard, the video managing information containing information to relate ones of the video data files to ones of the data files during a reproduction of the video data files which comply with the first predetermined standard.

2. The method according to claim 1, wherein the video data files are recorded to comply with an MPEG standard, and the data files are recorded with higher resolution than that of the video data files.

3. The method according to claim 2, wherein the data files are recorded to comply with a JPEG standard having a higher resolution than that of the video data files.

4. The method according to claim 1, wherein the video data files comply with a DVD video standard.

5. The method according to claim 4, wherein at least ones of the data files are image-still data files having a higher resolution than that of the video data files.

6. The method according to claim 4, wherein at least ones of the data files are second video data files which comply with a different resolution standard of MPEG than that of the video data files.

7. The method according to claim 1, wherein the video managing information recorded in a subject video data file enables selectable cross-referencing reproduction of ones of the data files related to the subject video data file, during a reproduction of the subject video data file.

8. The method according to claim 1, wherein the video managing information recorded in a subject video data file contains address information which enable selectable cross-referencing reproduction of ones of the data files related to the subject video data file.

9. The method according to claim 1, wherein the video disc recording and reproducing apparatus is at least partially a DVD video disc recording and reproducing apparatus for recording and/or reproducing image data from DVD discs.

10. A video disc recording and reproducing apparatus comprising:

a first recording section to record video data files which comply with a first predetermined standard;

a first directory section to record a first directory for managing the video data files, and which complies with the first predetermined standard;

a second recording section to record data files which are related to ones of the video data files, and which data files comply with a second predetermined standard which is different from the first predetermined standard;

a second directory section to record a second directory for managing the data files; and a video management section to record video managing information in the video data files, which video management information complies with the first predetermined standard, the video managing information containing information to relate ones of the video data files to ones of the data files during a reproduction of the video data files which comply with the first predetermined standard.

11. The apparatus according to claim 10, wherein recorded ones of the video data files comply with an MPEG standard, and recorded ones of the data files have a higher resolution than that of the video data files.

12. The apparatus according to claim 11, wherein recorded ones of the data files comply with a JPEG standard having a higher resolution than that of the video data files.

13. The apparatus according to claim 10, wherein recorded ones of the video data files comply with a DVD video standard.

14. The apparatus according to claim 13, wherein at least ones of the data files are image-still data files having a higher resolution then that of the video data files.

15. The apparatus according to claim 13, wherein at least ones of the data files are second video data files which comply with a different resolution standard of MPEG than that of the video data files.

16. The apparatus according to claim 10, wherein the video managing information recorded in a subject video data file enables selectable cross-referencing reproduction of ones of the data files related to the subject video data file, during a reproduction of the subject video data file.

17. The apparatus according to claim 10, wherein the video managing information recorded in a subject video data file contains address information which enable selectable cross-referencing reproduction of ones of the data files related to the subject video data file.

18. The apparatus according to claim 10, wherein the video disc recording and reproducing apparatus is at least partially a DVD video disc recording and reproducing apparatus for recording and/or reproducing image data from DVD discs.

19. A video disc comprising:

a first recording area having recorded video data files which comply with a first predetermined standard;

a first directory area having a recorded first directory for managing the video data files, which directory complies with the first predetermined standard;

a second recording area having recorded data files which are related to ones of the video data files, and which data files comply with a second predetermined standard which is different from the first predetermined standard;

a second directory area having a recorded second directory for managing the data files; and a video management area having recorded video managing information in the video data files, which video management information complies with the first predetermined standard, the video managing information containing information to relate ones of the video data files to ones of the data files during a reproduction of the video data files which comply with the first predetermined standard.

20. The video disc according to claim 19, wherein the video disc is a DVD disc.

* * * * *